United States Patent [19]
Bey

[11] Patent Number: 5,771,596
[45] Date of Patent: Jun. 30, 1998

[54] CONTAINER FOR LIQUIDS INCLUDING A LEVEL CONTROL AND A GYRO COMPASS

[75] Inventor: Ulf Bey, Groszharrie, Germany

[73] Assignee: Raytheon Anschuetz GmbH, Germany

[21] Appl. No.: 642,280

[22] Filed: May 3, 1996

[30] Foreign Application Priority Data

May 6, 1995 [DE] Germany .................. 195 16 695.7

[51] Int. Cl.[6] .................................................. G01C 19/38
[52] U.S. Cl. ............................ 33/327; 33/316; 33/324; 74/5.6 C; 137/210; 137/433
[58] Field of Search .......................... 33/316, 318, 324, 33/327, 346, 364, 398, 397; 74/5 R, 5.6 C; 137/210, 433

[56] References Cited

U.S. PATENT DOCUMENTS

| | | | |
|---|---|---|---|
| 1,231,976 | 7/1917 | Weitzel | 137/433 |
| 1,945,429 | 1/1934 | Fowler | 137/433 |
| 2,835,132 | 5/1958 | Vacquier | 74/5 |
| 3,653,267 | 4/1972 | Jacobson | 74/5 |
| 3,803,924 | 4/1974 | Schulien et al. | 74/5 R |
| 4,008,623 | 2/1977 | Ehrich et al. | 74/5 R |

*Primary Examiner*—Thomas B. Will
*Assistant Examiner*—Andrew Hirshfeld
*Attorney, Agent, or Firm*—Shlesinger, Fitzsimmons & Shlesinger

[57] ABSTRACT

A first liquid container has therein a level control including a float valve, a storage tank or second container and a third container having therein a liquid which is maintained at a fixed liquid level. The third container is connected to the liquid in the first container by the float valve, and is replenished by the liquid in the storage tank. Preferably the storage tank is designed as an evaporator, with a condensate separator plate or surface arranged above the third container which also has an overflow to the storage tank. A temperature stabilizer keeps the liquid in the first liquid container at a temperature above ambient, and the storage tank is in contact with the liquid in the first container to be warmed thereby, and the condensate separator is cooled by ambient air.

7 Claims, 1 Drawing Sheet

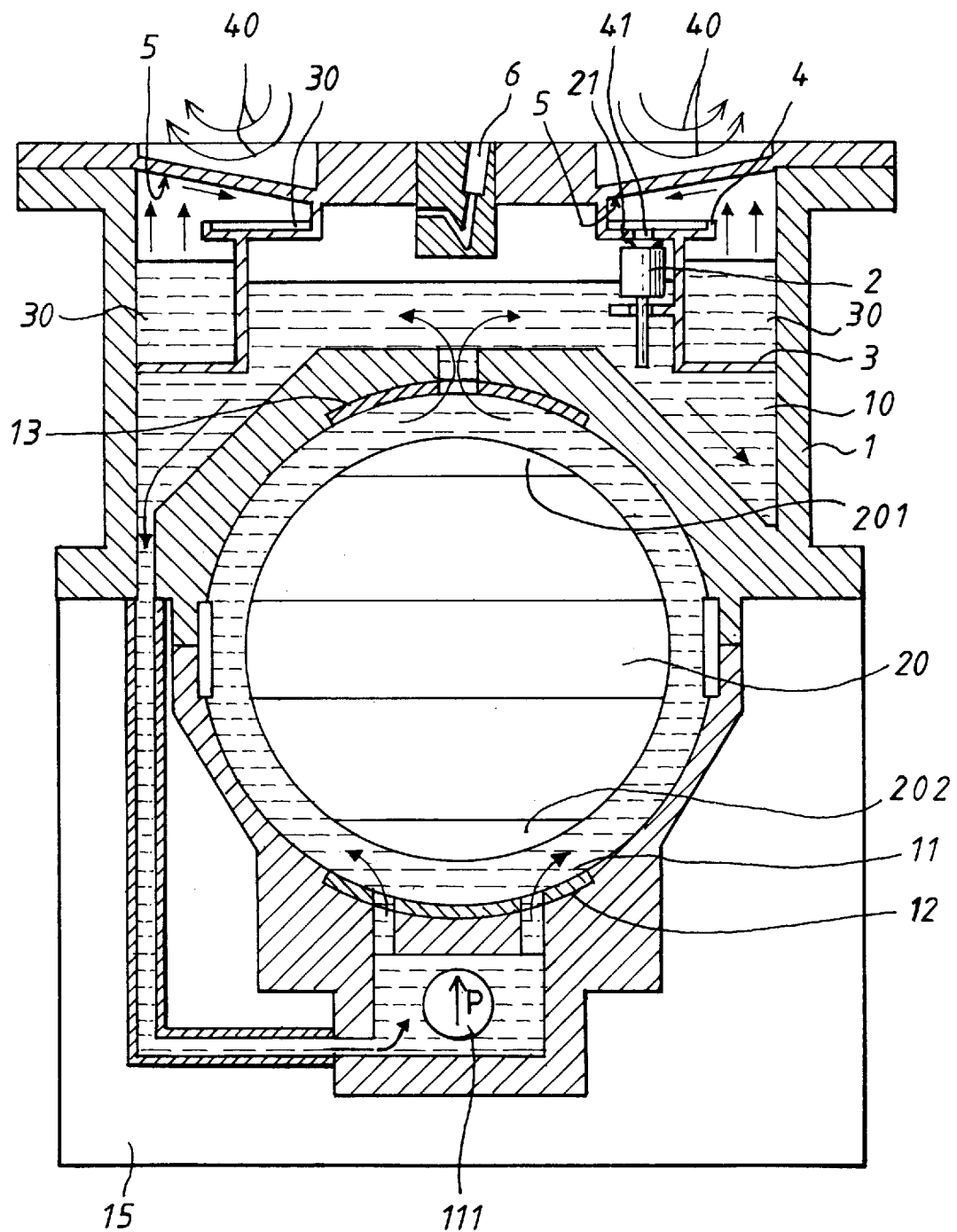

CONTAINER FOR LIQUIDS INCLUDING A LEVEL CONTROL AND A GYRO COMPASS

BACKGROUND OF THE INVENTION

The invention relates to a container for liquids including a level control consisting of a float valve and a storage tank.

All this is prior art. In conventional arrangements, the pressure of the liquid column initiating the opening of a float valve will decrease due to a reduction of liquid in the storage tank, therefore changing the control effect with a reducing liquid content. In order to ensure a large liquid content, the float valve is subjected to high pressure, therefore requiring a large-volume float valve.

A gyro compass including a hydrostatic bearing for the gyro is prior art from U.S. Pat. No. 3,803,924. The liquid container is hermetically sealed, with bellows used for pressure compensation. Furthermore, a gyro compass based on a hydrostatic bearing is prior art, in which a liquid, a water-based electrolyte, is used simultaneously for transmission of electric power to the gyro, resulting in electrolysis in the liquid, causing an unacceptable loss of liquid over an extended period of time arid thus producing gas.

It is the object of the invention to provide a design for a liquid container including a level control, thus providing a stable control irrespective of any liquid stored, allowing a large volume of stored liquid, based on a compact design and being suitable for a hydrostatically or hydrodynamically supported gyro compass.

SUMMARY OF THE INVENTION

This object is achieved by a liquid container according to claim 1, wherein in addition to a float valve and a storage tank, a third container having a fixed liquid level is provided, connected by a float valve to the liquid container and being replenished by the storage tank.

This arrangement allows complete disconnection of the float valve from any liquid volume in the storage tank, with long-term control remaining stable and allowing the use of a very small float valve and considerable freedom in the arrangement of the storage tank.

According to claim 2, an embodiment is preferred in which the storage tank is designed as an evaporator, in which a condensate separator is arranged above a third container, with the said third container including an overflow to the second liquid container or storage tank, thus allowing simple, safe replenishing of the third liquid container. Claims 3 and 4 are a description of another preferred embodiment.

The object is furthermore achieved by a gyro compass according to claim 5 and its advantageous embodiments based on sub-claims 6 and 7.

THE DRAWINGS

The invention will be described hereafter by means of a drawing, being a section through a hydrostatically supported gyro compass including a level control for the stored liquid.

PREFERRED EMBODIMENTS OF THE INVENTION

The liquid container 1 includes a hydrostatic bearing 11, being designed as a hall-shaped chamber in which a spherical gyro 20 is supported. The pump 111 allows the stored liquid 10 to be evenly circulated through the bearing 11. The arrows in the drawing mark the flow direction. In order to generate the necessary rotation, the gyro 20 is designed as a rotor of an electric motor, therefore having to be provided with electrical power. This is supplied by electric contacts 12, 13 on the liquid container 1 and 202, 201 on the gyro 20, between which the stored liquid 10, being a water-based, alkaline electrolyte, effects the conduction of power.

A side effect of this power conduction is the generation of gas and a change in the bearing liquid 10. A labyrinth bore 6 is provided for pressure compensation, through which, however, saturated air, together with the vapour of the stored liquid 10 will escape in case of pressure and temperature variations, for instance when starting the gyro compass.

The alkaline solution of the stored liquid 10 used therefore includes mechanisms causing a water loss, with a level control being provided for compensation. Water is the replenishing liquid 30.

The replenishing liquid 30 is held in a storage tank 3 from which it is passed into the third container 4 by evaporation, condensation on the condensate separator 5 and dripping or discharge, keeping the container always full to its brim, with excessive replenishing liquid 30 returning over the rim of the third container 4 to the storage tank 3.

An outlet 41 is provided in the bottom of the third container 4, and is connected to the liquid container 1, and normally is sealed by a soft lip seal 21, subject to a sufficient level of stored liquid 10 holding the float valve 2 closed.

When the level of the stored liquid 10 is reduced, the float valve 2 will open the outlet 41, allowing the replenishing liquid 30 in the third container 4 to be discharged.

The liquid column in the third container 4 pressurising the float valve 2 is always of the same level irrespective of the level of liquid stored in the storage tank 3, allowing the float valve 2—for as long as replenishing liquid 30 is available—always to be subject to the same conditions for opening, therefore keeping the control characteristics of the level control constant.

The transfer of liquid from the storage tank 3 to the third container 4 by evaporation and condensation is insured by providing a temperature stabilizer for stable operation of the gyro compass irrespective of the external temperature, keeping the liquid container 1, the hydrostatic bearing 11 and the gyro 20 at an elevated temperature above ambient air temperature 40. The storage tank 3 is provided with thin walls and arranged inside the liquid container 1, allowing the replenishing liquid 30 to be heated and developing an increased steam pressure. In comparison to this, the condensate separator 5 is designed as a thin wall connected to the ambient air 40, therefore being cooled. The temperature differential between the replenishing liquid 30 in the storage tank 3 and the internal wall of the condensate separator 5 is typically larger than 10°. The volume of the replenishing liquid 30 thus transferred is a multiple of the volume discharged by the float valve 2.

The shown design furthermore allows to produce a very compact level control having a small float valve 2, only acting oil a small column of replenishing liquid 30, but providing a large volume of replenishing liquid 30 and furthermore to store the same below the level of the storage liquid 10 in the storage tank 3.

The example of a hydrostatically supported gyro compass shown is naturally only one preferred embodiment and example for application of the liquid container including a level control according to the invention.

I claim:

1. A device comprising a first liquid container (1) having a supply of liquid (10) stored therein, and including a level control for the stored liquid, comprising a float valve (2), a liquid storage tank (3), and a further liquid container (4) having therein a liquid maintained at a fixed liquid level, said further container being connected by the float valve (2) to the liquid in said first container (1) to effect replenishment thereof, and said further container being replenished by the storage tank through an inlet portion spaced from the storage tank, (3) thereby to maintain said fixed liquid level therein.

2. A device according to claim 1, wherein the storage tank (3) is designed as an evaporator, with a condensate separator (5) being provided above said further container (4) and said further container (4) includes an overflow to the storage tank (3).

3. A device according to claim 2, wherein a temperature stabilizer (15) is provided and is capable of maintaining the supply of liquid (10) in the first liquid container (1) at a temperature above ambient temperature, the storage tank (3) being disposed in heat contact with the supply of liquid in said first container, and the condensate separator (5) being positioned to be cooled by ambient air (40).

4. A device according to one of the claims 1–3, wherein the storage tank (3) is at least arranged partially below the level of the supply of liquid (10) in the first liquid container (1).

5. A gyro compass formed from the device container of the type defined in one of claims 1 to 3, said compass having a hydrostatic bearing (11) formed from the supply of liquid in said first container, and including a gyro (20) supported in said bearing.

6. A gyro compass according to claim 5, wherein the first liquid container (1) includes a pressure-compensating labyrinth bore (6).

7. A gyro compass according to claim 5, wherein the supply of first (10) stored in the first container (1) is an electrolytic solution serving for power transmission to the gyro (20) and with the replenishing liquid (30) in the storage tank (3) and the further container (4) being the solvent for the electrolyte.

* * * * *